3,822,251
NITRATION

John J. Vrolyk, Northridge, and Randall D. Sheeline, Woodland Hills, Calif., assignors to Rockwell International Corporation
Filed Dec. 28, 1970, Ser. No. 101,692
Int. Cl. C07d 55/50, 55/60
U.S. Cl. 260—239 HM                                    1 Claim

ABSTRACT OF THE DISCLOSURE

A process is provided for reacting two or more chemical reactants in which the reactants are dispersed, under turbulent mixing conditions, in an inert liquid carrier which is essentially a non-solvent for the reactants and then reacted at a temperature below the boiling point of the liquid carrier while the turbulent conditions are maintained.

BACKGROUND OF THE INVENTION

(1) Field of the Invention

This invention relates to a method of conducting chemical reactions and particularly to a method of controlling the temperature of reaction, rate of reaction and other critical reaction parameters. More particularly, this invention relates to a method of conducting nitration reactions for the production of explosives.

(2) Description of the Prior Art

U.S. Pat. No. 3,022,149 discloses a process for uniformly mixing solids such as ammonium perchlorate with a polymeric binder. A dispersion of a polymerizable material in an inert, non-solvent liquid carrier is mixed, under turbulent conditions, with a dispersion of solids in an inert, non-solvent liquid carrier, said carriers being mutually miscible, and the polymerizable material and the solids are permitted to coalesce and form an agglutinate of substantially uniformly dispersed solids in the polymerizable material. The agglutinate is then separated from the dispersion medium and cured to form a solid cohesive substance of substantially uniform composition.

Great Britain Pat. No. 1,025,694 discloses a process for coating a solid particulate material with a polymeric coating which is similar to the process of U.S. Pat. No. 3,022,149, supra, except that the polymerizable material and the solids are not permitted to coalesce and form an agglutinate but rather the polymerizable material is polymerized while the turbulent conditions are maintained.

Nitration is used in the production of most chemical explosives. For example, nitric acid esters of polyhydric alcohols are obtained by the nitration, usually with nitric acid-sulfuric acid mixtures, of the appropriate alcohol (e.g., the nitration of glycerin to form nitroglycerin). As illustrative of aromatic nitrations, TNT is obtained by stepwise nitration of toluene and picric acid from nitration and hydrolysis of chlorobenzene. Aromatic nitrations are usually affected using a mixture of nitric and sulfuric acid in a temperature range of 0 to 120° C. Nitric acid-acetic acid-acetic anhydride mixtures and aqueous nitric acids have also been employed. A more complex nitration is the nitrolysis of hexamethylenetetramine (referred to herein as hexamine) to form the heterocyclic nitramines cyclo - 1,3,5 - trimethylene-2,4,6-trinitramine (referred to herein as RDX) and cyclo-1,3,5,7 - tetramethylene - 2,4,6,8 - tetranitramine (referred to herein as HMX). The simplest method of preparing RDX is based on the introduction of hexamine into an excess (about 4 to 8 times the theoretical amount) of concentrated (about 98 to 100%) nitric acid free of nitric oxides at 25 to 30° C. and thereafter pouring the reaction mass into cold water. RDX can also be prepared from hexamine and nitric acid in the presence of ammonium nitrate in accordance with the following ideal equation at about 80° C.:

$$C_6H_{12}N_4 + 2NH_4NO_3 + 4HNO_3 \rightarrow 2(CH_2N \cdot NO_2)_3 + 6H_2O$$

HMX can be prepared in accordance with the Bachmann et al. process [*J. Am. Chem. Soc.*, 73, 2769 (1951)] in which 1,5-methylene-3,7-dinitro-1,3,5,7-tetrazacyclooctane (referred to herein as DPT), prepared from hexamine and nitric acid in the presence of acetic anhydride and acetic acid at 15 to 30° C., is subjected to nitrolysis with nitric acid in the presence of ammonium nitrate and acetic anhydride at 60 to 65° C. A comprehensive review of the preparative reactions for RDX and HMX is found in Urbanski, T., *Chemistry and Technology of Explosives*, Vol. III, Pergarmon Press (1967), Chapter IV, "Heterocyclic Nitramines," p. 77.

U.S. Pats. Nos. 2,737,522, 2,951,866 and 3,111,538 disclose nitration reactions using turbulent reaction conditions. For example, U.S. Pat. No. 2,951,866 discloses a method for the continuous manufacture of explosive liquid nitric acid esters of polyhydric alcohols in which separate streams of polyhydric alcohol and precooled nitrating acid are caused to impinge upon each other at sufficient flow rates to form a turbulent reaction mixture stream in a turbulent reaction zone. The resulting reaction mixture is fed through the reaction zone at a flow rate corresponding to a Reynolds number of at least about 1000 until substantially all of the polyhydric alcohol has reacted with the nitrating acid to form explosive liquid nitric acid ester. While the reaction mixture is maintained in emulsified form in the tubular reactor, there is no disclosure of the use of an inert, non-solvent liquid carrier. Pat. No. 3,111,538 discloses an improvement over U.S. Pat. 2,951,866, supra. U.S. Pat. No. 2,737,522 discloses the use of an aspirator of the Venturi type wherein a vacuum is relied upon to suck or pull the relatively viscous liquid polyhydric alcohol into a jet stream of nitrating acid.

U.S. Pat. No. 2,435,544 discloses carrying out a nitration in the presence of a diluent which is substantially inert to the reacting materials, is substantially immiscible with water, has a suitable boiling point and is preferably a solvent of the compound to be nitrated as well as the product of nitration. Since the reactant as well as the product is preferably soluble in the diluent, any heat evolved during the reaction is said to be distributed throughout the mass of the solution. An azeotropic mixture of water and diluent is formed and, as distillation takes place at the boiling point of the azeotrope, the water is removed as it is evolved together with diluent.

SUMMARY OF THE INVENTION

An object of the present invention is the provision of a process for controlling the temperature of reaction, rate of reaction and other critical reaction parameters of a chemical reaction and particularly for controlling highly exothermic and dangerous reactions found, for example, in the preparation of explosives by nitration. Other objects and advantages of the present invention will become apparent upon reading the undergoing specification and claim.

In accordance with the present invention, chemical reactants are dispersed, by turbulent mixing, in a liquid carrier. The reactants are reacted while the turbulent mixing conditions are maintained (1) to ensure that the reactants remain dispersed in the liquid carrier until the reaction is near completion, (2) to ensure rapid and thorough mixing of the dispersed reactants while reaction is taking place and (3) to ensure rapid heat transfer between the dispersed reactants and liquid carrier. The liquid carrier is essentially non-reactive with and is essentially a non-solvent for the reactants. Since the reactants are dispersed, as opposed to being dissolved, in the liquid carrier, the carrier has essentially no dilution effect on the reactants. Additional reactants and/or temperature adjusted carrier can be added to the dispersion as the reaction progresses to modify the final reaction product and/or adjust the temperature of reaction. While the reaction can be performed as a batch process, it is preferred to carry out the process in a continuous manner. The process is particularly described in relation to nitration reactions for the production of explosives.

DETAILED DESCRIPTION OF THE INVENTION

Figure 1:
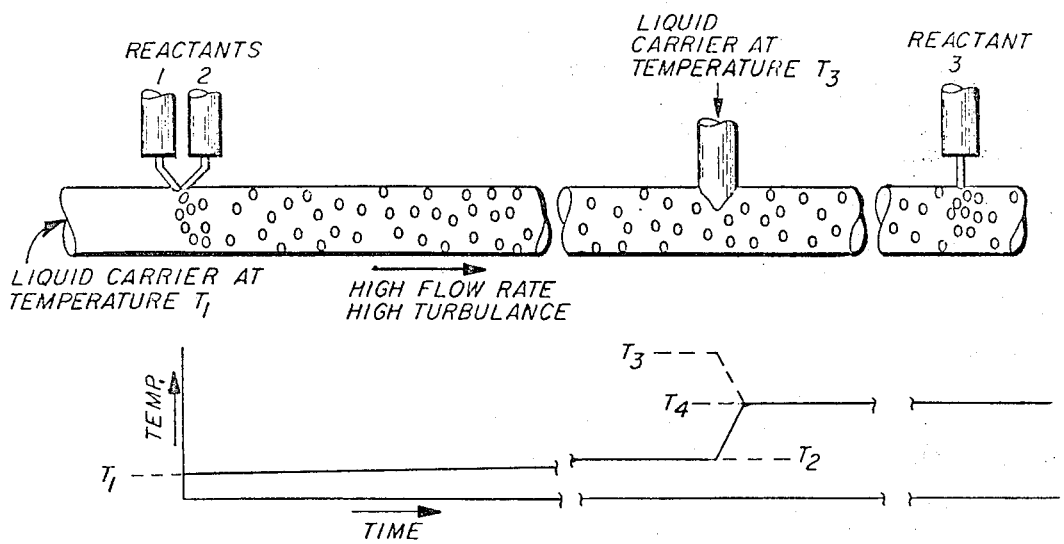
FIG. 1 is a hypothetical time-temperature program for conducting an exothermic chemical reaction in which reactants 1 and 2 are dispersed in very fine droplet or particle form in a high velocity stream of inert liquid carrier at temperature $T_1$, said liquid carrier being essentially a non-solvent for the reactants, a side stream of carrier at temperature $T_3$ is caused to enter the reaction dispersion now at temperature $T_2$ due to the exothermic reaction of reactants 1 and 2 to establish a new temperature $T_4$ and reactant 3 is dispersed in very fine droplet or particle form in the highly turbulent carrier stream downstream of the side stream of carrier at temperature $T_3$.

A process is provided for reacting two or more chemical reactants in which the reactants are dispersed, by turbulent mixing, in a liquid carrier with which the reactants are essentially non-reactive and in which the reactants are essentially insoluble. The reactants can be solids and/or liquids; however, it is generally preferred that at least one of the reactants be a liquid or a solution of a solid in an appropriate solvent. The reactants can be used in undiluted form or can be dissolved in appropriate solvents as long as the solvent does not interfere with the reaction. If the solvent is miscible with the carrier, part or all of the reactant will be thrown out of solution and will be dispersed under the turbulent mixing conditions as an undiluted droplet or particle of reactant in the carrier. The reactant which is not thrown out of solution will be dispersed in droplet form in which the droplet is composed of the reactant in solution in the solvent. It is obvious, of course, that if the solvent is completely immiscible with the carrier the reaction solution *per se* will be dispersed in droplet form. The reactants, or solutions of reactants, may be mutually miscible or mutually immiscible. If they are mutually miscible, any given dispersed droplet of reactant may comprise a solution of two or more reactants.

The turbulent mixing can be accomplished by conventional mixing, stirring, shaking or other agitation means. If the process is to be carried out in a continuous manner, turbulent mixing can be affected by bringing separate high velocity streams of reactant and liquid carrier together at a common point and affecting mixing by the turbulence set up at the point at which the streams meet. Aspirators of the Venturi type which rely on vacuum to suck one reactant into the jet stream of another reactant can also be employed. Instead of separately bringing streams of reactant and liquid carrier together at a common point, one or more of the reactants can first be dispersed in liquid carrier and then subsequently joined with the other reactants which may or may not be similarly dispersed.

The liquid carrier in which the reactants are dispersed must be essentially non-reactive with the reactants and reaction products and must be essentially a non-solvent for the reactants. It is generally preferred to employ a carrier which will not dissolve more than about 0.05 g./ml. of the reactants. However, this solubility limit is not sharply critical and carrier which will dissolve a greater amount of reactant may be employed as long as sufficient reactant is dispersed to effect a reasonably rapid and complete reaction. About 1 to 30 weight percent and, more commonly, about 1 to 20 weight percent liquid carrier based on the total quantity of liquid carrier and dispersed reactant is usually employed. The liquid carrier may be a single liquid or a mixture of two or more miscible liquids. The same dispersion medium may be used for each of the reactants when they are first individually dispersed before being brought together under turbulent mixing conditions or, conversely, different dispersion mediums may be employed.

The present invention differs from Great Britain Pat. No. 1,025,694, among other things, in that the reaction is conducted in the absence of non-reactive solid particulate material which does not take part in or catalyze the chemical reaction. While reaction does take place in the process of the Great Britain patent, for example, by the crosslinking of polymeric material, the reaction occurs after the polymerizable material is coated on the non-reactive solid particulate material and produces individual discrete solid particles coated with solid polymeric material. In contrast, the present invention is not a coating process and does not result in the preparation of polymeric coated solids.

Liquid carriers which may be employed in carrying out the process of the present invention include aliphatic and olefinic hydrocarbons having from about 3 to about 16 carbon atoms such as propane, butane, hexane, heptane, octane, dodecane, hexadecane, 2-octene, 1-dodecene and 1-hexadecene. Examples of usable cyclic hydrocarbons are cyclohexane and methylcyclohexane. Examples of aromatic and alkylaromatic compounds which may be employed as dispersion mediums include compounds having from 6 to about 16 carbon atoms such as benzene, toluene, xylene, 2,4-diphenylbenzene, phenyldecane, Decalin and 1-hexyl Decalin. Halogen derivatives of the above hydrocarbons may also be employed as dispersion mediums. Examples of these are ethylenedichloride, trichlorethylene, methylenedichloride, chlorobenzene, bromobenzene and iodobenzene. Compounds of the Freon series such as dichlorodifluormethane and dichlorotetrafluorethane may also be employed. Usable liquid siloxane carriers have the formula $(R_3SiO)_m(R_2SiO)_n(R_3Si)_m$ in which R is alkyl of 1 to 8 carbon atoms, $n$ is 0 to 6, and $m$ is 0 or 1, provided that, if $m$ is 0, $n$ is 3 to 5. Other possible dispersion mediums are alcohols having from 1 to about 12 carbon atoms and from 1 to about 3 hydroxyl groups such as methyl alcohol, ethyl alcohol, benzyl alcohol, glycerin and dodecyl alcohol. Amines having from about 2 to 12 carbon atoms and from 1 to about 3 nitrogen atoms such as ethylenediamine, diethylenetriamine, dodecylamine, pyridine and quinoline can also be employed. Ethers, ketones, aldehydes and esters having from about 2 to about 16 carbon atoms may also be used. Examples of these are ethylether, acetone, propionaldehyde, ethyl acetate, butyl dodecanoate and butyl Cellosolve. It is obvious that the exact choice of carrier will depend on the reactants used since some of the above mentioned carriers may be reactive with and/or substantially miscible with the reactants which are employed.

The dispersed droplets or particles of reactant are essentially small reaction sites suspended in liquid carrier. Since the reactants are essentially only present in the dispersion in dispersed form, the liquid carrier does not act to dilute the reactants. Additionally, since the reactants are dispersed in a large volume of relatively inert liquid, control of the temperature of reaction is easily achieved. The liquid carrier acts as a heat sink which can, for example, supply or absorb the heat of reaction depending on whether the reactive is endothermic or exothermic. Controlling the temperature of reaction in turn controls the reaction rate and thus provides a mechanism for preventing uncontrolled temperature excursions and reaction runaway.

More specifically, since the reactants are dispersed in fine droplet or particle form, the heat generated (or absorbed) by their chemical reaction must travel only a very short distance (e.g., 0.010 inch) before reaching the heat sink formed by the carrier. Additionally, the temperature drop (or rise) between the center of the droplet or particle and the heat sink is small, ensuring that the reaction temperature is very close to the average temperature of the dispersion medium even when highly exothermic and rapid reaction is taking place. In general, the heat transfer rate is increased as the droplet or particle diameter is decreased since the heat transfer surface area per volume of reactant is increased and the distance from the center of the droplet or particle to the heat sink (carrier) is reduced. Accordingly, it is generally preferred to employ very high turbulence in dispersing the reactants in order to obtain very small droplets or particles of reactant suspended in the carrier.

After dispersing the reactants in the liquid carrier, reaction occurs while the turbulent mixing conditions are maintained and at a temperature below the boiling point of the liquid carrier. It is not necessary that the reaction temperature be below the normal boiling point of the carrier as long as the reaction temperature is below the boiling point of the carrier under the reaction conditions empolyed (e.g., high pressure). Agglomeration of the reaction droplets and/or particles occurs but rapid break-up of the agglomerates occurs equally frequently due to the turbulent mixing. In the final stages of reaction, the turbulent reaction conditions can be reduced to encourage agglomeration which in turn aids in the separation process. After the reaction is completed, the turbulent mixing is discontinued and the dispersion is fed to a separation zone where the reaction solids, if any, are removed and the various liquid phases separated.

In accordance with the process of the present invention, the temperature of the droplets or particles of reactant can initially be controlled by controlling the temperature of the liquid carrier entering the reaction zone since the droplets or particles take on the temperature of the surrounding liquid carrier very rapidly under turbulent mixing conditions. The course of the reaction can easily be programmed in either a batch or a continuous process. The temperature of the carrier and accordingly the temperature of the dispersed reactants can be adjusted at predetermined intervals by the use of conventional heat exchange equipment or by the addition of carrier in a predetermined amount and at a predetermined temperature. Temperature sensors can be placed in the reactor in a batch process or along the reaction path in a continous process to monitor the progress of the reaction and provide information for automatic control of the temperature. If a continuously flowing stream of reaction dispersion is employed, side streams of liquid carrier can be provided at predetermined intervals to very rapidly adjust the temperature of the dispersed reactants. As the side stream of carrier enters the main stream of flowing reaction dispersion, the high turbulence of the flowing reaction dispersion and the high turbulence set up by the mixing of the two streams causes very rapid and complete mixing of the streams resulting in the very rapid establishment of a new temperature for the main stream of liquid carrier and an almost immediate change in the temperature of the dispersed reactants. FIG. 1 illustrates a hypothetical time-temperature program for conducting an exothermic chemical reaction in a continuously flowing reaction stream.

Referring to FIG. 1, reactants 1 and 2 are pumped under pressure through metering pumps (not shown) which control their flow rate precisely. The two streams separately enter an inert, non-solvent liquid carrier such as n-heptane through appropriately sized orifices which disperse the reactants as very fine droplets or particles in the carrier. The temperature of the carrier, which is flowed through the reaction zone at a high flow rate and with high turbulency, has previously been adjusted to $T_1$ (e.g., 13° C.). The flowing stream of dispersed reactant and carrier travels downstream a predetermined distance (e.g., 6 feet) in a predetermined period of time (e.g., 2 seconds) where it is joined by additional carrier the temperature of which has been adjusted to $T_3$ (e.g., 20° C.). The dispersion will immediately change from temperature $T_2$ (e.g., 14° C.) to temperature $T_4$ (e.g., 17° C.) and will remain at this temperature for a programmed period of time (e.g., 3 seconds) before being joined by reactant 3 or, if desired, by further carrier at temperature $T_5$ (not shown).

While the process of the present invention can be used in conducting innumerable chemical reactions, it is particularly suited for nitrating nitratable organic compounds to produce, for example, nitric acid esters of polyhydric alcohols such as diethylene glycol dinitrate and nitroglycerin, aromatic nitro compounds such as trinitrotoluene (TNT) and heterocyclic nitramines such as RDX and HMX. Suitable nitratable organic compounds include polyhydric alcohols and particularly aliphatic diols and triols such as alkylene glycols (e.g., ethylene glycol and diethylene glycol) and glycerin as well as aromatic compounds such as toluene. Hexamine, the starting reactant in the preparation of RDX and HMX, can also be mentioned as illustrative of organic compounds which can be subjected to nitration, or more specifically nitrolysis, according to the process of the present invention. Conventional nitrating acids may be used in the nitration reactions in accordance with the present invention. Nitrating acids vary in concentration depending upon their usage. The most common consist of nitric acid mixed with sulfuric acid or nitric acid mixed with acetic anhydride.

Figure 2:
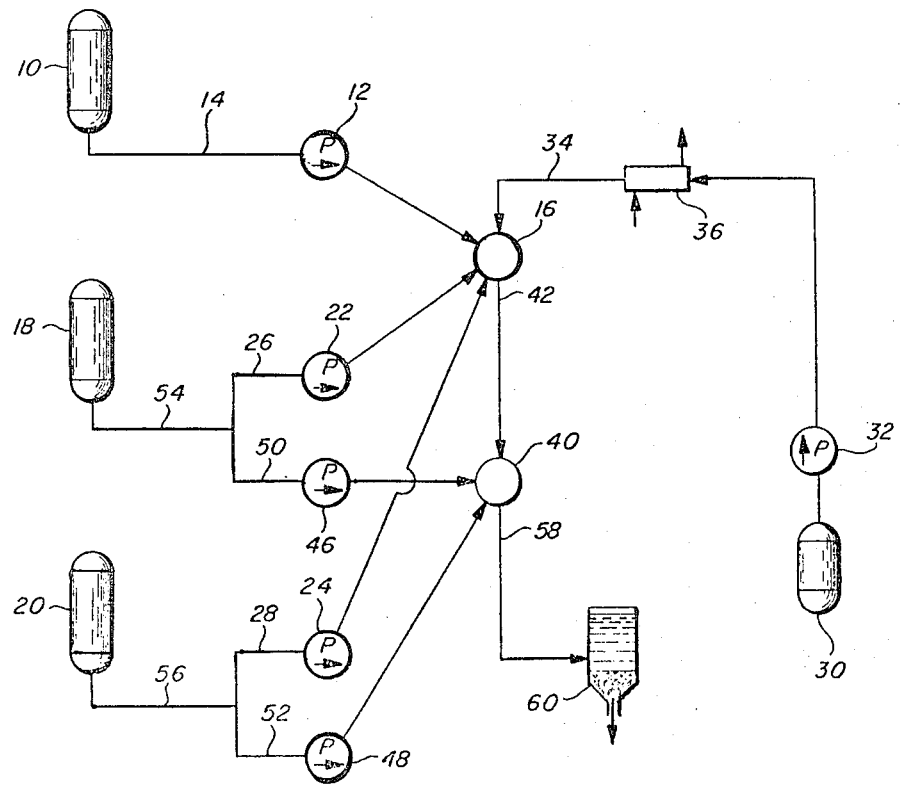
FIG. 2 is a flow diagram for the continuous production of HMX by the nitrolysis of hexamine.

A continuous process for the production of HMX by the nitrolysis of hexamine is set forth in FIG. 2. For purposes of illustration a modified form of the Bachmann et al. process, *supra*, is schematically set forth in the figure. This modified Bachmann et al. process generally comprises simultaneously, continuously and equivalently feeding hexamine, acetic acid, nitric acid, ammonium nitrate (referred to herein as AN) and acetic anhydride to a reaction zone which is maintained at a temperature of about 44° C. and allowing the reaction mixture to age for about 15 minutes. The second stage reactants, namely, nitric acid, AN and acetic anhydride, are then added to the reaction mixture over about a 25 minute period and aged for about 1 hour. The reaction mixture is then preferably poured into water and simmered on a steam bath for several minutes. The final product will comprise HMX and RDX; however, the exact quantity of each product will vary depending on the exact reaction conditions employed. It should be understood that the reaction times set forth, *supra*, with respect to the modified Bachmann et al. process will not necessarily be the reaction times which will be used when the process is run employing the reaction procedure of the present invention but are merely set forth as illustrative of the reaction times presently employed in the art and as a general guideline for employing the present invention. The employment of the present invention will normally result in markedly reduced reaction times; however, the preferred reaction time for each stage of the reaction will depend on the concentration of the reactants, etc. and will be determined in conventional manner on a trial and error basis.

Referring to FIG. 2, a mixture of hexamine and acetic acid containing about 62 weight percent acetic acid from storage tank 10 is continuously fed through metering pump 12 at a predetermined rate via line 14 to a first jet mixer 16 which has separate, appropriately sized orifices for each inlet stream. Simultaneously, a mixture of nitric acid (98%) and AN containing about 56 weight percent AN from storage tank 18 and acetic anhydride from storage tank 20 are continuously fed through metering pumps 22 and 24, respectively, at predetermined rates via lines 26 and 28, respectively, to first jet mixer 16. The separate liquid streams composed of (1) a mixture of hexamine and acetic acid, (2) a mixture of nitric acid and ammonium nitrate and (3) acetic anhydride in about a 1.6:1:3.2 weight ratio are mixed, under turbulent conditions, with a liquid carrier (about 1 to 30 weight percent) such as n-heptane which is essentially inert with respect to the reactants and reaction products and is essentially a nonsolvent for (1), (2) and (3) above in the first jet mixer 16. The inert liquid carrier is continuously supplied at a predetermined rate to first jet mixer 16 from storage tank 30 by pump 32 in line 34. Heat exchanger 36 in line 34 is used to adjust the temperature of the inert liquid carrier to 44−1° C. The turbulent mixing in first jet mixer 16 forms a dispersion of very fine droplets of (1), (2) and (3) above in the liquid carrier. The reaction dispersion from first jet mixer 16 is continuously fed to a second jet mixer 40 via line 42 at a sufficiently high flow rate to maintain the reaction dispersion in a state of turbulence. The length of line 42 is appropriately set to provide the desired dwell time between first jet mixer 16 and second jet mixer 40. Simultaneously, a mixture of nitric acid and AN from storage tank 18 and acetic anhydride from storage tank 20 are continuously fed through metering pumps 46 and 48, respectively, at predetermined rates via lines 50 and 52, respectively, to second jet mixer 40 which has separate, appropriately sized orifices for each inlet stream. The mixture of nitric acid and AN enters each of lines 26 and 50 via line 54. In like manner, acetic anhydride enters each of lines 28 and 52 via line 56. The separate liquid streams composed of (1) a mixture of nitric acid and AN and (2) acetic anhydride in about a 1:3.2 weight ratio are mixed, under turbulent conditions, with the reaction dispersion from jet mixer 16 in jet mixer 40. The quantity of the mixture of nitric acid and AN added to second jet mixer 40 is about 1.5 times greater, by weight, than the quantity of the mixture which is added to first jet mixer 16. The reaction dispersion is continuously fed from second jet mixer 40 via line 58 at a sufficiently high flow rate to maintain the reaction dispersion in a state of turbulence to separator 60. The length of line 58 is appropriately set to provide the desired dwell time between second jet mixer 40 and separator 60. HMX and RDX are continuously separated from spent nitrating acid and liquid carrier in separator 60. Excess liquid carrier can be separated from the spent nitrating acid and, if desired, recycled to jet mixer 16.

The following non-limitive examples further illustrate the invention:

EXAMPLE 1

The reaction of diethylene glycol (DEG) and nitric acid to form diethylene glycol dinitrate (DEGDN) is a rapid and highly exothermic reaction. This reaction is conveniently carried out at about 10° C. using a procedure in which one reactant is slowly added to the other reactant to permit removal by external cooling of the heat which is generated. If DEG and nitric acid are rapidly added together, the rapid generation of heat results in uncontrolled reaction and possible detonation of the DEGDN.

A reactor fitted with an agitator was charged with 1.75 cc. of nitrating acid composed of 50.7 weight percent nitric acid and 49.3 weight percent sulfuric acid (97%). The reactor was then charged with 50 cc. of n-heptane and cooled in an ice bath. When the temperature of the contents of the reactor reached 10° C., 0.70 cc. of DEG was quickly added to the reactor and was mixed, under the highly turbulent conditions set up by the agitator, with the nitrating acid and n-heptane. The temperature of the reaction was controlled by the presence of the heptane so that a maximum temperature rise of only 10° was observed. After turning off the agitator, three liquid layers immediately formed composed of spent acid on the bottom, reaction product in the center and heptane on top. The volume of the reaction product was 0.8 cc. The reaction product was separated, neutralized with sodium carbonate solution and extracted with ethylene chloride. The extract was dried with anhydrous magnesium sulfate, centrifuged and the liquid removed. The extract was then further dried with dry nitrogen gas resulting in 0.5 cc. of final product which was determined by IR spectrum and refractive index to be DEGDN.

EXAMPLE 2

A reactor fitted with an agitator was immersed in a constant temperature bath maintained at 44±1° C. The reactor was charged with 24.4 ml. of acetic acid, 2.2 ml. of acetic anhydride and 300 ml. of heptane and the agitator was started. The reactor was then charged with (1) 26.6 grams of a mixture of hexamine and acetic acid containing about 62 weight percent acetic acid, (2) 16.5 grams of a mixture of nitric acid and AN containing about 56 weight percent AN and (3) 53.7 grams of acetic anhydride in the following manner. A burette of each of (1), (2) and (3) was marked off into 32 equal increments. The reactants were added in the following order: one increment of (1), then one increment of (2) and finally one increment of (3). This order of addition was continued until all 32 increments of each of (1), (2) and (3) had been added to the reactor. One increment of each of (1), (2) and (3) was added to the reactor about every 30 seconds. The contents of the reactor were continually mixed, under turbulent conditions, by the agitator. After all 32 increments of (1), (2) and (3) had been added to the reactor, the reactor was charged with (4) 24.8 grams of a mixture of nitric acid an AN containing about 56 weight percent AN and (5) 79.5 grams of acetic anhydride. The mixture of nitric acid and AN was added to the reactor first and then the acetic anhydride. This order of addition was continued about every 30 seconds until 32 equal increments of (4) and (5) had been added to the reactor as was done with respect to (1), (2) and (3) above. The reaction dispersion was aged for about 90 minutes, using continuous agitation to maintain the reaction dispersion in a state of turbulence. During aging a reflux condenser was fitted on the reactor and after aging the agitator was stoped and 190 ml. of cool water was added to the reactor and the bath temperature was raised to about 80° C. The reaction mixture was simmered at 80 to 82° C. for 30 minutes and then cooled to 30° C. The solids were filtered off, washed three times with distilled water and dried to yield 18.34 grams of crude product. The crude product, upon purification, gave HMX in 86% of the theoretical yield.

We claim:
1. A continuous process for the production of cyclo-1,3,5 - trimethylene - 2,4,6-trinitramine and cyclo-1,3,5,7-tetramethylene-2,4,6,8-tetranitramine by the nitrolysis of hexamethylenetetramine comprising:
   (A) simultaneously and continuously feeding separate liquid streams of (a) a mixture of hexamethylenetetramine and acetic acid, (b) a mixture of nitric acid and ammonium nitrate, (c) acetic anhydride and (d) a liquid carrier which is essentially non-reactive with and which is essentially a non-solvent for (a), (b) and (c) to a first reaction zone;
   (B) continuously mixing, under turbulent conditions, the separate streams which are fed to the first reaction zone to disperse (a), (b) and (c) in said liquid carrier;

(C) continuously feeding the dispersion from the first reaction zone to a second reaction zone at a sufficiently high flow rate to maintain the dispersion in a state of turbulence;
(D) simultaneously and continuously feeding separate liquid streams of (b) and (c) to said second reaction zone;
(E) continuously mixing, under turbulent conditions, the separate streams which are fed to the second reaction zone; and
(F) feeding the dispersion from the second reaction zone at a sufficiently high flow rate to maintain the dispersion in a state of turbulence to a separation zone and continuously separating the reaction products from the spent nitrating acid and liquid carrier.

References Cited

UNITED STATES PATENTS

| | | | |
|---|---|---|---|
| 2,525,252 | 10/1950 | Willson et al. | 260—248 |
| 2,535,350 | 12/1950 | Crater | 260—248 |
| 2,656,355 | 10/1963 | Bachmann | 260—248 |
| 2,678,927 | 5/1954 | Wright et al. | 260—248 |
| 2,798,870 | 7/1957 | Bachmann. | |

JOHN M. FORD, Primary Examiner

U.S. Cl. X.R.

260—248 NS, 467, 645